(12) United States Patent
Rooney

(10) Patent No.: US 8,558,403 B2
(45) Date of Patent: Oct. 15, 2013

(54) SINGLE MOORED OFFSHORE HORIZONTAL TURBINE TRAIN

(76) Inventor: Thomas Rooney, Marathon, FL (US)

(*) Notice: Subject to any disclaimer, the term of this patent is extended or adjusted under 35 U.S.C. 154(b) by 389 days.

(21) Appl. No.: 12/891,241

(22) Filed: Sep. 27, 2010

(65) Prior Publication Data
US 2012/0074704 A1 Mar. 29, 2012

(51) Int. Cl.
*F03B 13/00* (2006.01)
*H02P 9/04* (2006.01)
*F03B 13/10* (2006.01)

(52) U.S. Cl.
USPC ............................................. 290/54; 290/43

(58) Field of Classification Search
USPC .................................................... 290/43, 54
See application file for complete search history.

(56) References Cited

U.S. PATENT DOCUMENTS

| | | | |
|---|---|---|---|
| 2,501,696 A * | 3/1950 | Souczek | 290/43 |
| 4,023,041 A * | 5/1977 | Chappell | 290/53 |
| 4,205,943 A * | 6/1980 | Vauthier | 416/86 |
| 4,219,303 A * | 8/1980 | Mouton et al. | 415/7 |
| 4,558,744 A * | 12/1985 | Gibb | 166/335 |
| 4,850,190 A | 7/1989 | Pitts | 60/398 |
| 6,091,161 A * | 7/2000 | Dehlsen et al. | 290/43 |
| 6,104,097 A * | 8/2000 | Lehoczky | 290/54 |
| 6,168,373 B1 * | 1/2001 | Vauthier | 415/7 |
| 6,374,764 B1 * | 4/2002 | Davenport et al. | 114/265 |
| 6,463,801 B1 * | 10/2002 | Young et al. | 73/170.32 |
| 6,531,788 B2 | 3/2003 | Robson | 290/4 |
| 6,856,036 B2 | 2/2005 | Belinsky | 290/42 |
| 6,910,831 B2 * | 6/2005 | Raines | 405/224.1 |
| 7,291,936 B1 | 11/2007 | Robson | 290/43 |
| 7,352,074 B1 * | 4/2008 | Pas | 290/43 |
| 7,352,078 B2 | 4/2008 | Gehring | 290/54 |
| 7,470,086 B2 | 12/2008 | Jennings | 405/76 |
| 7,471,009 B2 * | 12/2008 | Davis et al. | 290/54 |
| 7,489,046 B2 * | 2/2009 | Costin | 290/43 |
| 7,541,688 B2 * | 6/2009 | Mackie | 290/54 |
| 7,682,126 B2 * | 3/2010 | Parker | 415/3.1 |
| 7,737,570 B2 * | 6/2010 | Costin | 290/43 |
| 7,851,936 B2 * | 12/2010 | Bolin | 290/54 |
| 7,936,077 B2 * | 5/2011 | Lehoczky | 290/43 |
| 7,939,957 B2 * | 5/2011 | Costin | 290/54 |
| 7,976,245 B2 * | 7/2011 | Finnigan | 405/224 |
| 8,022,567 B2 * | 9/2011 | Davis et al. | 290/54 |
| 8,188,613 B2 * | 5/2012 | Lee | 290/54 |
| 8,288,882 B2 * | 10/2012 | Bolin | 290/54 |
| 8,441,141 B1 * | 5/2013 | Ouellette et al. | 290/55 |
| 2005/0121917 A1 | 6/2005 | Kikuchi | 290/53 |
| 2005/0285407 A1 * | 12/2005 | Davis et al. | 290/54 |
| 2007/0096472 A1 * | 5/2007 | Mondl | 290/54 |

(Continued)

*Primary Examiner* — Pedro J Cuevas
(74) *Attorney, Agent, or Firm* — Allen, Dyer, Doppelt, Milbrath & Gilchrist, P.A.

(57) ABSTRACT

The invention is directed to a single moored offshore marine turbine assembly having a central control vessel which includes a main vessel tethered to a control buoy. The main vessel having a first cap, a corresponding second cap and a tubular shell positioned between both the first cap and second cap. The tubular shell contains one or more vertical partitions to assist in ballasting. The control buoy includes a compressor and an air conduit which forces air into the main vessel through a manifold. A hollow suction caisson affixes the central control vessel to the ocean floor. A taut line mooring secures the suction caisson to the main vessel. Electricity is generated via a turbine shroud assembly having a conical shroud and a hydro-turbine. By attaching a plurality of turbine shroud assemblies in series via cables, a horizontal turbine train is formed resulting in a simple, economical and safe layout.

14 Claims, 5 Drawing Sheets

(56) References Cited

U.S. PATENT DOCUMENTS

| | | | |
|---|---|---|---|
| 2008/0012345 A1* | 1/2008 | Parker | 290/54 |
| 2009/0091135 A1 | 4/2009 | Janca et al. | 290/54 |
| 2009/0243300 A1* | 10/2009 | Davis et al. | 290/54 |
| 2010/0007148 A1 | 1/2010 | Davis et al. | 290/54 |
| 2010/0045043 A1 | 2/2010 | Gostner | 290/52 |
| 2010/0066089 A1 | 3/2010 | Best et al. | 290/52 |
| 2010/0074750 A1 | 3/2010 | Henriksen | 416/85 |
| 2010/0127499 A1 | 5/2010 | Anderson | 290/52 |
| 2010/0135729 A1* | 6/2010 | Finnigan | 405/224 |
| 2010/0148512 A1 | 6/2010 | Pitre | 290/54 |
| 2010/0221069 A1* | 9/2010 | Brinkmann et al. | 405/203 |
| 2011/0215650 A1* | 9/2011 | Slocum et al. | 307/72 |
| 2012/0126540 A1* | 5/2012 | Healy | 290/53 |
| 2012/0257955 A1* | 10/2012 | Rooney | 415/7 |

* cited by examiner

SINGLE MOORED OFFSHORE HORIZONTAL TURBINE TRAIN

FIELD OF THE INVENTION

The invention is directed to a plurality of horizontally positioned hydro-turbines positioned offshore which are tethered via a single mooring to harness kinetic energy from water currents. The invention may further include a control vessel having an inner cavity with a plurality of vertical partitions to regulate the depth of the various turbines below the water surface.

BACKGROUND OF THE INVENTION

With the continued rise in fossil fuel costs and associated risks in acquiring such fuels, a large number of alternative energy solutions have recently risen in popularity. Such alternative energy solutions not only decrease dependence upon foreign countries to supply energy to the United States, but also serve to decrease the carbon footprint and reverse the effects of global warming. Moreover, the goal of such alternative solutions ultimately is to reduce the price of energy and improve the overall standard of living.

One viable alternative energy solution is wind energy, in the form of wind farms. Such farms include a plurality of positioned wind turbines, which have steadily decreased in cost and increased in reliability. Despite these advances, these wind farms are criticized as eyesores, in addition to the increased risk of bird deaths (caused by birds flying into the turbines during migrations). A second alternative energy is solar. While the cost of photovoltaic cells has decreased, the overall cost of solar energy continues to be a deterrent.

Although less publicized, a third viable alternative energy solution is hydroelectric energy. One popular example of hydroelectric is the Hoover Dam which uses the kinetic properties of water to help serve the energy needs of most of Nevada. However, construction of additional dams (and related barrages) are not contemplated, mostly because of environmental considerations. Despite the ability to harness wave power as a second hydroelectric energy source, many have criticized wave power because these systems obstruct the coastal shore areas. This has lead to research into the third most common form of hydroelectric energy, obtaining kinetic energy from the various deep water currents found in our waterways.

There exist several pilot programs of current farms within the United States. This includes a project in the East River in New York, as well as certain tidal projects planned in San Francisco Bay, Peugeot Sounds, and in Maine. However, all of these locations afford limited sources of deep water currents, while posing significant risks to ship and pleasure craft traffic entering these large metropolitan areas.

The Gulf Stream located along the waters of the Southeast coast affords the largest and most powerful ocean currents in the world for purposes of conversion into electricity. For example there exists a three knot current approximately 20 miles wide off of Jupiter Inlet, Fla. Such current varies with the seasons, where July has the strongest current while November has the weakest. Despite these numbers, this source of kinetic energy remains virtually untapped—with limited plans for developing any technology to harness this alternative energy source. This is largely attributed to the fact that while several means have been created to harvest ocean currents, few have been found to be viable or reliable.

As an initial example, U.S. Pat. No. 4,850,190 issued to Pitts on Jul. 25, 1989 relates to a complex suspension system having multiple support cables which attach to buoyancy chambers, which in turn suspend multiple electric generating units which form a matrix of turbines. The technology requires numerous flotation modules and support cables, as well as buoyancy modules at various intervals, where each module provides slight positive buoyancy. Such design suffers from a complex arrangement of devices, which are bulky and difficult to accurately position below the water's surface to maximize contact with the current.

As a second example of a water turbine assembly, U.S. Pat. No. 6,856,036 issued on Feb. 15, 2005 to Bilinsky teaches a rectangular semisubmersible platform having hydraulic turbines with funnels. Multiple electrical generators are located on a structure above water and transmit electric power to the shore utilizing flexible cable. The semisubmersible platform consists of an upper structure, intermediate section and a lower frame. Such design teaches away from a fully submerged assembly, or a system for controlling depth to maximize exposure to current.

As a third example, U.S. Pat. No. 6,531,788 issued on Mar. 11, 2003 to Robson is directed to two counter-rotating, rear-facing turbines with a plurality of rotor blades extending radially outward from two separate horizontal axis that convey the kinetic energy from the two side-by-side turbine rotors through separate gearboxes to separate generators that are housed in two watertight nacelles that are located sufficiently far apart to provide clearance for the turbine rotors. The two generators and their gearboxes serve as ballast and are located below a streamlined buoyancy tank that extends fore and aft above and between them. A leverage system having no moving parts adjusts lifting forces to balance changing downward vector forces that result from changes in drag acting on the downward angled anchor line.

One key design feature is use of a streamlined torpedo-shaped buoyancy tank having a vertical tail fin capable of improving directional stability of said submersible electrical power generating structure, a pair of airfoil-shaped hydrofoils, a pair of side-by-side counter-rotating full-bladed water turbine rotors, and a pair of watertight nacelles. Moreover, this vertical tail fin can be on either said top side of said submersible electrical power generating structure extending upward or said bottom side of said submersible electrical power generating structure extending downward. Such design requires direct attachment to each turbine or a tandem of turbines—which increase overall costs and complexity due to the excessive number of moorings.

Accordingly, there is a need in the art of hydro-turbine assembly design for an improved design which allows more accurate regulation of the height of the various water turbines to maximize contact with water currents within a large body of water such as the ocean, a river or related waterway. Such design should allow limited use of moorings and related attachments to the ocean floor. Moreover, such design should maximize placement of various hydro-turbines in a manner that allows improved access for maintenance.

SUMMARY OF THE INVENTION

The present invention solves many of the short comings found the current design of hydroelectric systems used to harness water currents. The invention teaches a system for harnessing the energy of ocean, river and gulf streams to take advantage of natural kinetic energy via a prefabricated, scalable and cost effective assembly. More specifically, the system may include a single moored turbine assembly which forms a horizontal turbine train which can accurately change elevation to contact the water currents at their maximum velocity below the ocean's surface.

The turbine assembly includes a central control vessel of two-part construction having a main vessel tethered to a control buoy. Preferably tear shaped to aide in hydrodynamics and to absorb the high downward drag forces, the main vessel includes a first cap, a corresponding second cap and a tubular shell positioned between both the first cap and second cap. Positioned within the tubular shell are a plurality of vertical perforated and solid partitions to assist in ballasting. The control buoy also includes a compressor and an air conduit which forces air into the main vessel through a manifold to control the elevation of the turbine assembly. The main vessel may also include both a hydrofoil and stability fins to assist in stabilizing the main vessel.

A foundation, which may be in the form of a hollow suction caisson, is used to affix the central control vessel to the ocean floor. The suction caisson may include a first end, corresponding second end and a tubular shaft. The first end has a sharp edge to assist in lodging the suction caisson within the surface of the ocean. A mooring line of two-part construction affixes the suction caisson to the main vessel. A first portion of the mooring line is metal linked chain, while the second portion is high strength polymer. Preferably, the mooring line attaches to the first end of the suction caisson.

The main vessel of the central control vessel allows connection with one or more turbine shroud assemblies. Each turbine shroud assembly may include a conical shroud and a hydro-turbine capable of generating electricity. The turbine shroud assembly connects via a first set of cables to a positioning buoy as well as a second set of cables to affix the turbine shroud to the main vessel. A plurality of turbine shroud assemblies may be positioned in series through cables to form a horizontal turbine train. Kinetic energy created by each hydro-turbine may be transferred to an electric collection system having a main feed line which transfers electricity generated by the hydro-turbine to a transformer positioned within the central control vessel, which in turn feeds the electricity to one or more substations used to transmit the electricity to a land substation and/or a grid.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overall Components of the Turbine Assembly

Figure 1:
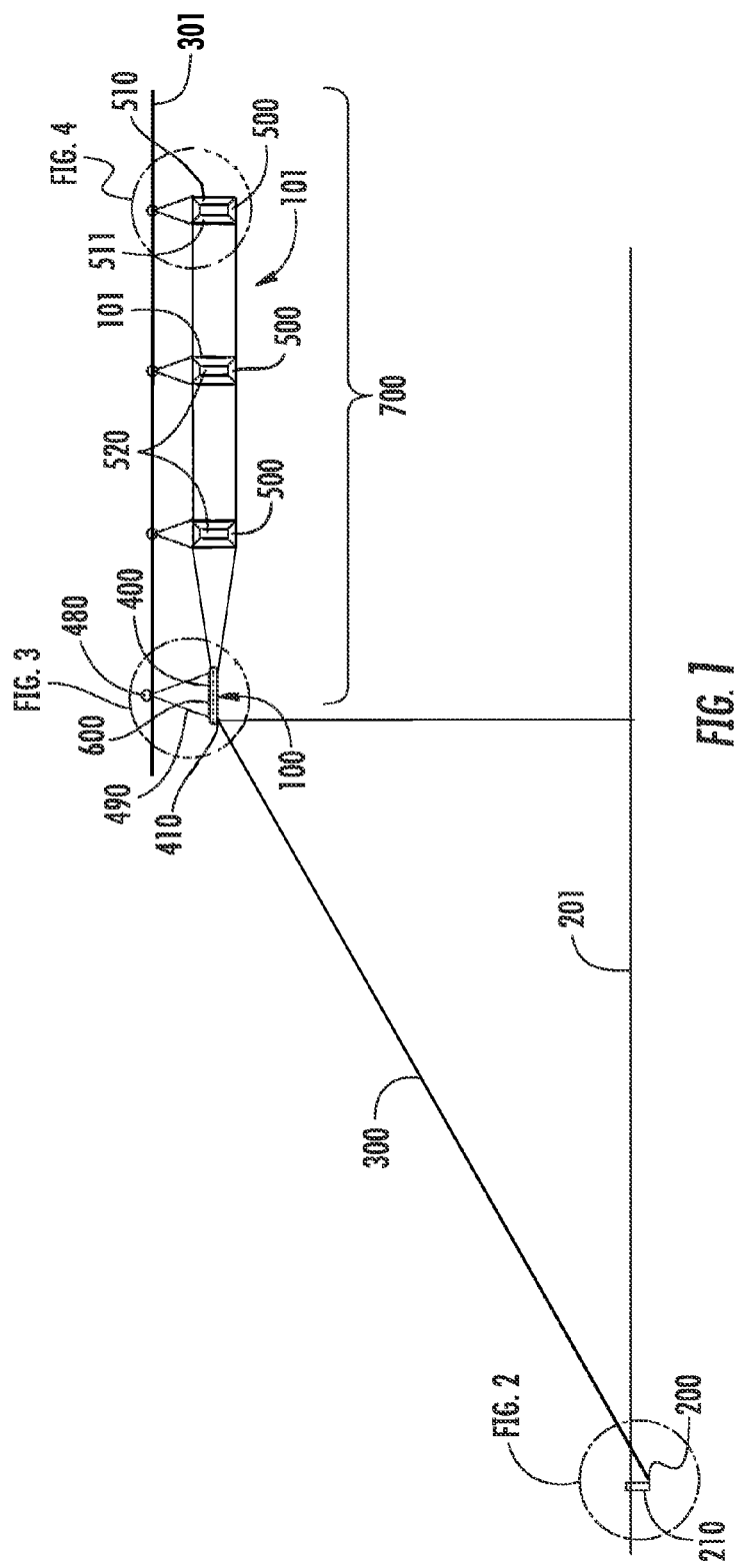
FIG. 1 is a front view illustrating the turbine assembly including use of the central control vessel.

FIG. 1 illustrates, by way of example, the preferred components 101 of a turbine assembly 100 used to harness the kinetic energy of deep water currents (which can be drawn from the ocean, rivers or other waterways). As shown, the turbine assembly 100 preferably includes a suction caisson 200, a mooring line 300, and a central control vessel 400 attached to the suction caisson 200 via the mooring line 300. A plurality of turbine shrouds 500 (each having at least one hydro-turbine 520) are placed in series with one another. Each turbine shroud 500 forms part of an electric collection system 600 to generate and supply electricity for later consumption. Such system effectively creates a single moored turbine assembly 100 where there are multiple hydro-turbines 520 horizontally positioned to form a turbine train 700 located below the surface of the water 301. While FIG. 1 illustrates one manner of arranging the turbine train 700, one of ordinary skill in the art upon having the benefit of the teachings of the present invention, will recognize and appreciate other related embodiments for the turbine assembly 100.

As further shown in FIG. 1, the invention calls for a foundation 210 in the form of a suction caisson 200 capable of securing the various components 101 of the turbine assembly to the ocean floor 201. As soil conditions within the ocean floor 201 vary greatly, such foundation 210 must be designed to cut through various soft layers of silty clay as well as dense sand located below the ocean floor 201. This foundation 210 must also contemplate seismic events common along the ocean floor 201, which may risk dislodging the turbine assembly 100 if not properly moored.

Positioned between the foundation 210 and the central vessel 400 is a mooring line 300. The mooring line 300 (which, is preferably a taut mooring line) is rigidly affixed to the suction caisson 200 and has a sufficient length to position the central vessel 400 at a predetermined depth 302 below the ocean surface 301 to maximize contact with water currents. Such mooring line 300 is preferably made of a resilient high tension material that is non-corrosive.

Further shown in FIG. 1, a key feature of the turbine assembly 100 is the central control vessel 400 used to regulate the correct position of the various turbine shroud systems 500 below the ocean surface 301. While this control vessel 400 may take many a form, the device preferably has a two-part construction having a main vessel 410 in direct communication with a control buoy 480 positioned above the ocean surface 301. An air conduit 490 attached to the control buoy 480 feeds compressed air into the main vessel 410 housing to help regulate height. Preferably, such main vessel 410 is regulated at a position approximately 100 feet below the water surface 210, or any acceptable height such that the turbine assembly 100 is not affected by atmospheric weather conditions (including hurricanes) or the movement of ships and other watercraft.

Affixed to the aft end of the central control vessel 400 is the turbine train 700 comprised of a plurality of horizontally positioned turbine shrouds 500. The turbine shrouds 500 with hydro-turbines 520 are positioned in linear series so as to reduce the number of mooring systems and to simplify the turbine train 700. While such turbine train 700 is preferably formed from this series of hydro-turbines 520, the invention also contemplates placement of two hydro-turbines 520 in parallel within a single shroud. The hydro-turbine 520 can range in size and dimension, but is preferably between twenty to thirty meters in diameter. Selection of the proper turbine shroud 500 size will be based upon typical conditions within the area for placement of the turbine train 700. For example, a 20 meter diameter hydro-turbine 520 and a shroud of 34 meters may be used to harness the currents of the Gulf Stream. Each turbine shroud 500 is made of two part construction: a steel plate shroud 510 which is preferably hollow, and a hydro-turbine 520 positioned within the plate shroud 510. Such shroud 510 is preferably filled with a buoyant material 511, such as Styrofoam, to make the overall turbine shroud 500 have neutral buoyancy and safe from sinking.

The Foundation and Mooring Line

Figure 2:
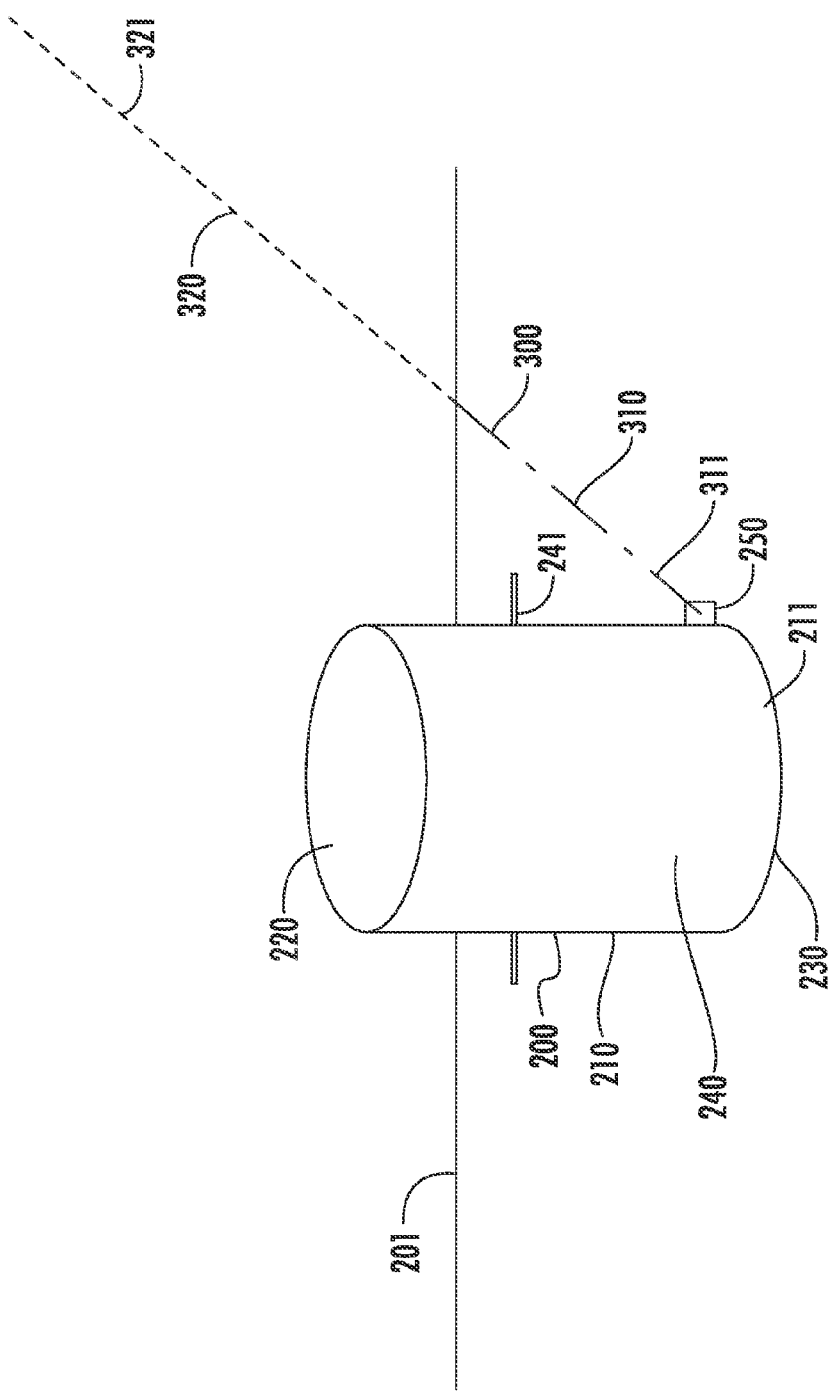
FIG. 2 is a front view showing the various components of the suction caisson.

FIG. 2 offers, by way of example, one embodiment of both the foundation 210 and the single mooring line 300 contemplated for use with the turbine assembly 100. As shown, the foundation 210 is preferably a suction caisson 200 of tubular shape and construction. The suction caisson 200 includes a first end 220, a corresponding second end 230 and a tubular shaft 240. Moreover, such foundation 210 is preferably hollow and made of a strong, heavy, material such as steel.

Preferably, the first end 230 of the suction caisson 200 includes a sharp knife edge 211. This sharp edge 211 in addition to a vacuum created in the suction caisson 200 functions to assist in driving the suction caisson 200 deep into the various soft layers of silty clay and well as dense sand located below the ocean floor 201. Moreover, the tubular shaft 240 may include various perpendicular fins 241 which function to prevent movement or raising of the suction caisson 200 once secured to the ocean floor 201. Although the shape and size of such suction caisson 200 varies depending upon the size of the turbine train 700, its typically has a minimum dimension of 20 foot diameter and a length of 60 feet.

Located approximate the first end 220 of the suction caisson 200 is a rigid fastener 250. While the fastener 250 can take many a form and may vary in size, it is preferably a large circular structure. The fastener 250 is designed to secure and engage the mooring line 300 to the suction caisson 200. Through affixing the mooring line 300 below the ocean floor 201, its exact location will be determined by the geotechnical design.

As further shown in FIG. 2, the mooring line 300 may include a first portion 310 and corresponding second portion 320. More specifically, the invention contemplates a first portion 310 which directly connects to the fastener 250 and positioned within the ocean floor 201. Such first portion 310 is preferably a metal linked chain 311, but can be any similar design and material which is strong and highly resilient. Preferably, such metal link chain 311 has capacity determined by the design.

In addition, the mooring line 300 also includes a second portion 320 which is preferably a high strength polyester rope 321. Such polyester rope 321 connects to the metal link chain 311, as well as with the central control vessel 400 (shown in FIG. 1 and FIG. 3). The rope may be two part construction to handle the tension forces. The benefit of using the polyester rope is that it is neutrally buoyant and the result is a taut line mooring. A taut line mooring eliminates a long, cumbersome and complicated catenary construction which may result in interference with other turbine trains. Another benefit of such two-part construction for the mooring line 300 allows the turbine train 700 to be attached to the ocean floor 201 via a single mooring. Putting multiple turbines in a train results in reduced construction and assembly costs for the turbine assembly 100, because the entire train can be preassembled on shore this results in less time necessary to implement the technology.

The Central Control Vessel

Figure 3:
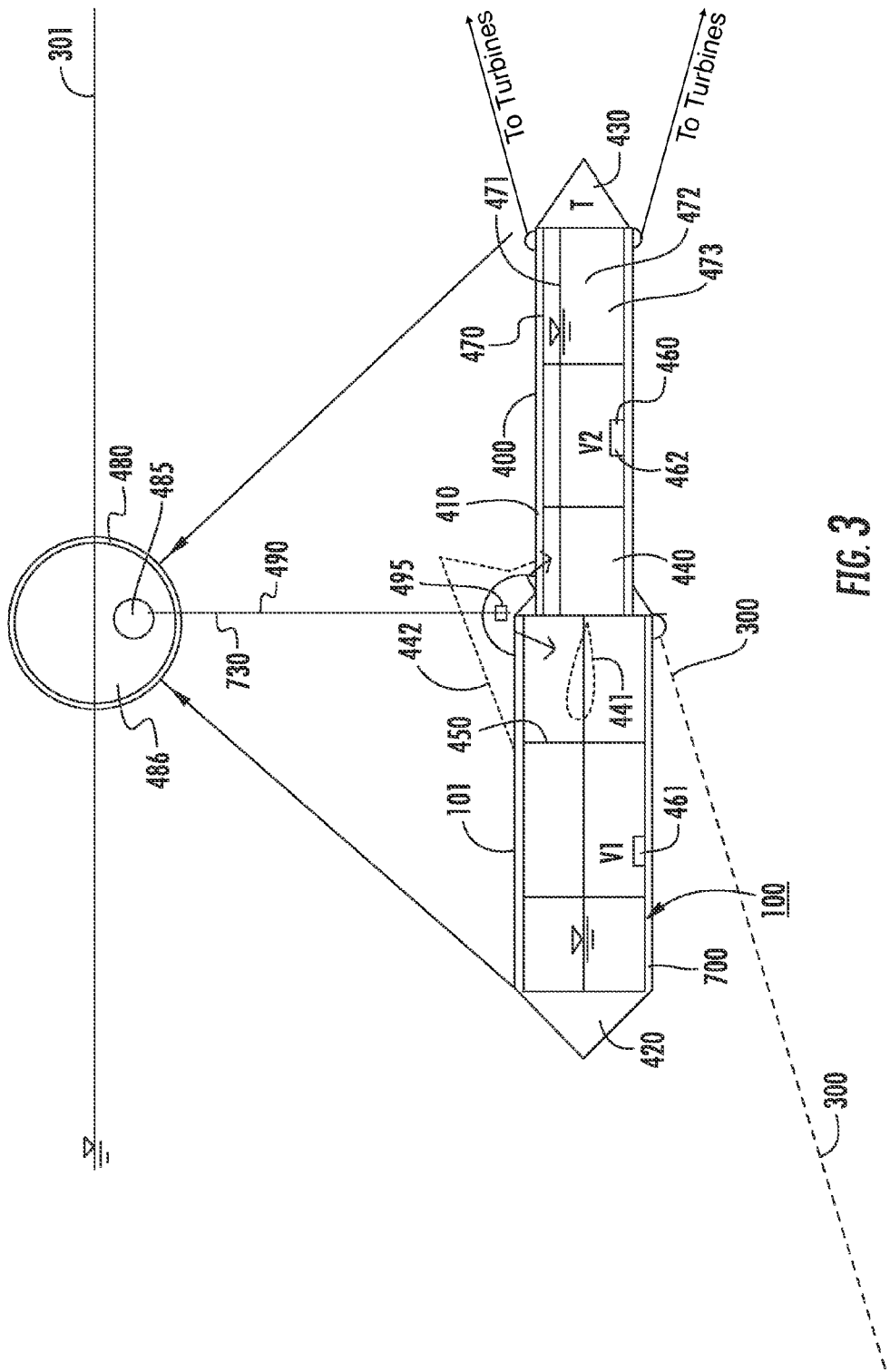
FIG. 3 is a side view showing the various components of the central control vessel.

FIG. 3 illustrates, by way of example, the salient components of the central control vessel 400. The primary function of the central control vessel 400 is to positively maintain a constant depth below the ocean surface 301 so that the turbine train 700 can maximize use of the strongest water currents. Typically, this requires positioning of the central control vessel 400 some 100 feet below the ocean surface 301. This helps ensure the turbine train 700 remains out of the influence of hurricane wave action, as well as prevents contact with large commercial and/or military vessels. In addition the control vessel 400 will maintain a level attitude minimizing drag forces caused via contact with the water currents. This method is a much more positive way of assuring depth than only relying on hydrofoil action.

While such central control vessel 400 can take many a form and shape, it is preferably of two-part construction having a main vessel 410 along with a control buoy 480. The main vessel 410 is preferably tubular in shape and circular in cross section. The scale of such main vessel 410 for a 20 meter turbine assembly 520 (FIG. 4) is contemplated at 120 feet long with a cross sectional diameter of 24 feet. Moreover, the main vessel 410 can be manufactured of high strength ½ inch steel piping, wherein the walls include 1 feet thick Styrofoam to offset the weight of the piping to increase buoyancy.

As shown in FIG. 3, the main vessel 410 is essentially tubular in cross section. With the step down in size of the vessel offsets the large downward forces created by the mooring line 300. The main vessel 410 can alternatively include a tear shape to help assist with hydrodynamics. Regardless whether the main vessel 410 is tubular or tear shaped in construction, it includes a first end cap 420 and a corresponding second end cap 430. Positioned between both caps 420 and 430 is a hard tubular shell 440.

Positioned within the tubular shell 440 of the central control vessel 400 are a plurality of vertical partitions 450 sufficient to provide ballasting. These vertical partitions 450 are perpendicular to (and placed within) the tubular shell 440. Moreover, each vertical partition 450 is essentially parallel to (and placed equidistant to) one another. Preferably, one or more of these partitions 450 are solid and some are perforated. The solid partitions 450 form chambers for ballasting and controlling the attitude of the vessel. The perforated partitions 450 control the speed of movement of the ballast water. The use of these partitions 450 ensures that the main vessel 410 remains in a stationary position below the ocean surface 301 and remains level.

The elevation of the main vessel 410 is aided through use of the control buoy 480 positioned at the ocean surface 301. The control buoy 480 preferably includes three main components: an air conduit 490 which links the control buoy 480 to the main vessel 410, a compressor 485 positioned in the control buoy 480 that helps draw outside air 486 into the air conduit 490, and a manifold 495 positioned on the tubular shell 440 which allows entry of air 486 into the main vessel 410.

Accordingly the control buoy 480 offers two main functions for the control vessel 400. The first function is a placard to spot the turbine assembly 100 from above the ocean surface 301. Often, the control buoy 480 is painted with a bright and/or reflective material to further assist in locating the device. The ready ability to locate the system in turn allows quick maintenance of the turbine assembly 100, as well as the ability to retrieve individual components 101 for repairs.

The second function of the control buoy 480 includes the ability to force air 485 into the main vessel 410 via a manifold 495. Through the addition of air 485, the main vessel can rise and elevate closer to the ocean surface 301. In comparison, by reducing air 485 through the manifold 495, the main vessel 410 will lower.

A set of valves 460 positioned along the tubular shell 440, to further assist vertical positioning of the main vessel 410. Such set includes a first valve 461 and corresponding second valve 462 which function to remove air 485 (and alternatively add water) to the tubular shell 440. Combination of the compressed air 485 via the manifold 495, placement of vertical partitions 450 within the tubular shell 440 and use of valves 460 all function to position the control vessel 400 at a pre-desired position below the ocean surface 310—to maximize exposure to water currents. The valve system will also move ballast water from the fore and aft compartments to make sure the control vessel 400 stays level. There are two instruments in the control vessel 400 controlling the compressor in the buoy and the valves in the control vessel. One reports level and the other depth and provides the signal to the computer controlling the vessel.

In addition, the tubular shell 440 of the main vessel 410 can include both stability fins 441 and hydro-foil 442 attachments to increase stability and maintain a stable altitude within the water current. The main vessel 410 can also include a computer 470 attached to sensors 471 capable of measuring internal air pressure, outside water pressure, the flow rate of the water current, and water temperature. The computer 470 may include a processor 472 and memory device 473 in order to record this information, as well as relay it to the control buoy 480 for transmission. Such computer 470 can also signal addition or removal of air within the tubular shell 440 to regulate proper elevation and attitude.

Turbine Shroud Assembly

Figure 4:
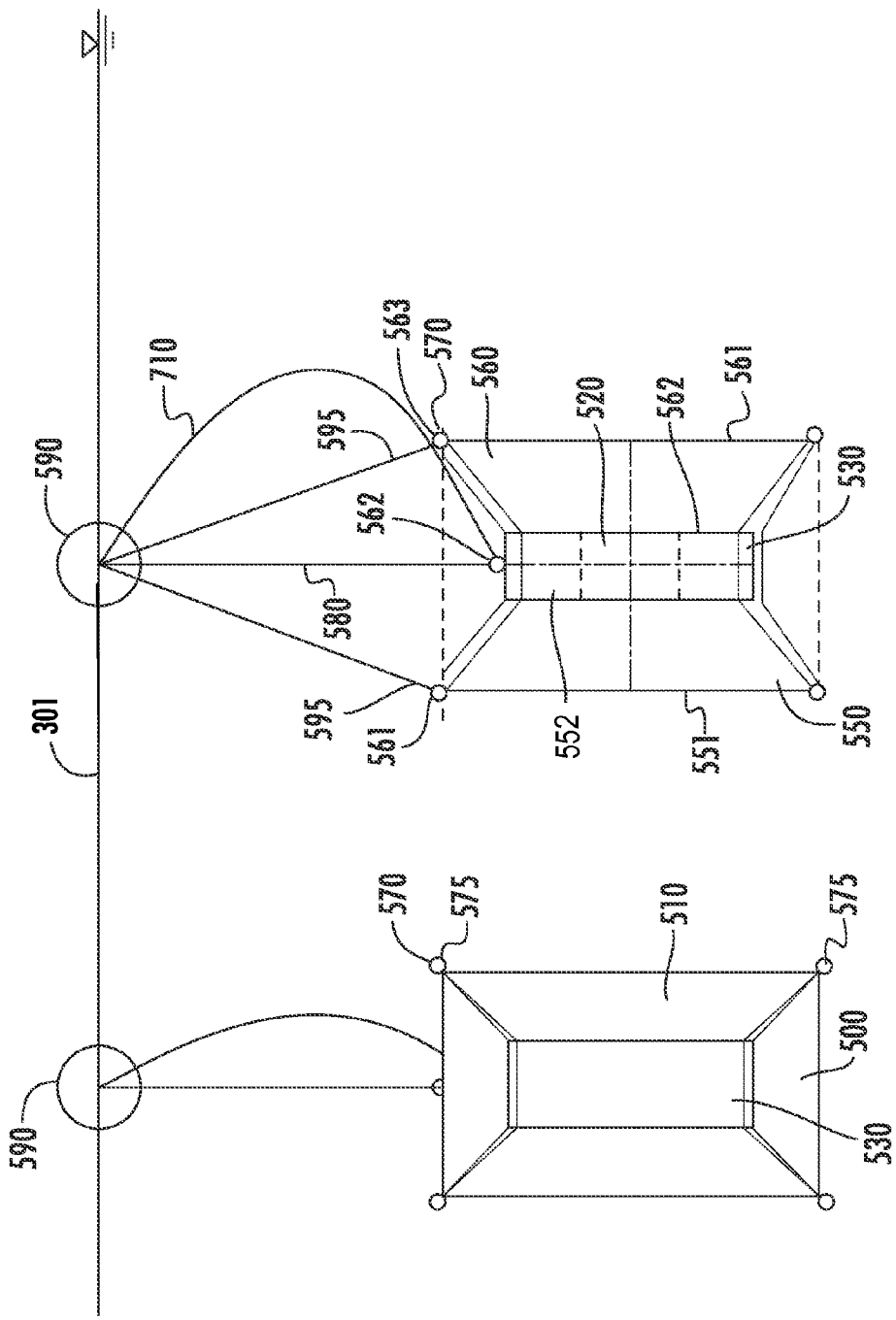
FIG. 4 illustrates how each individual turbine is suspended below the ocean's surface.
Figure 5:
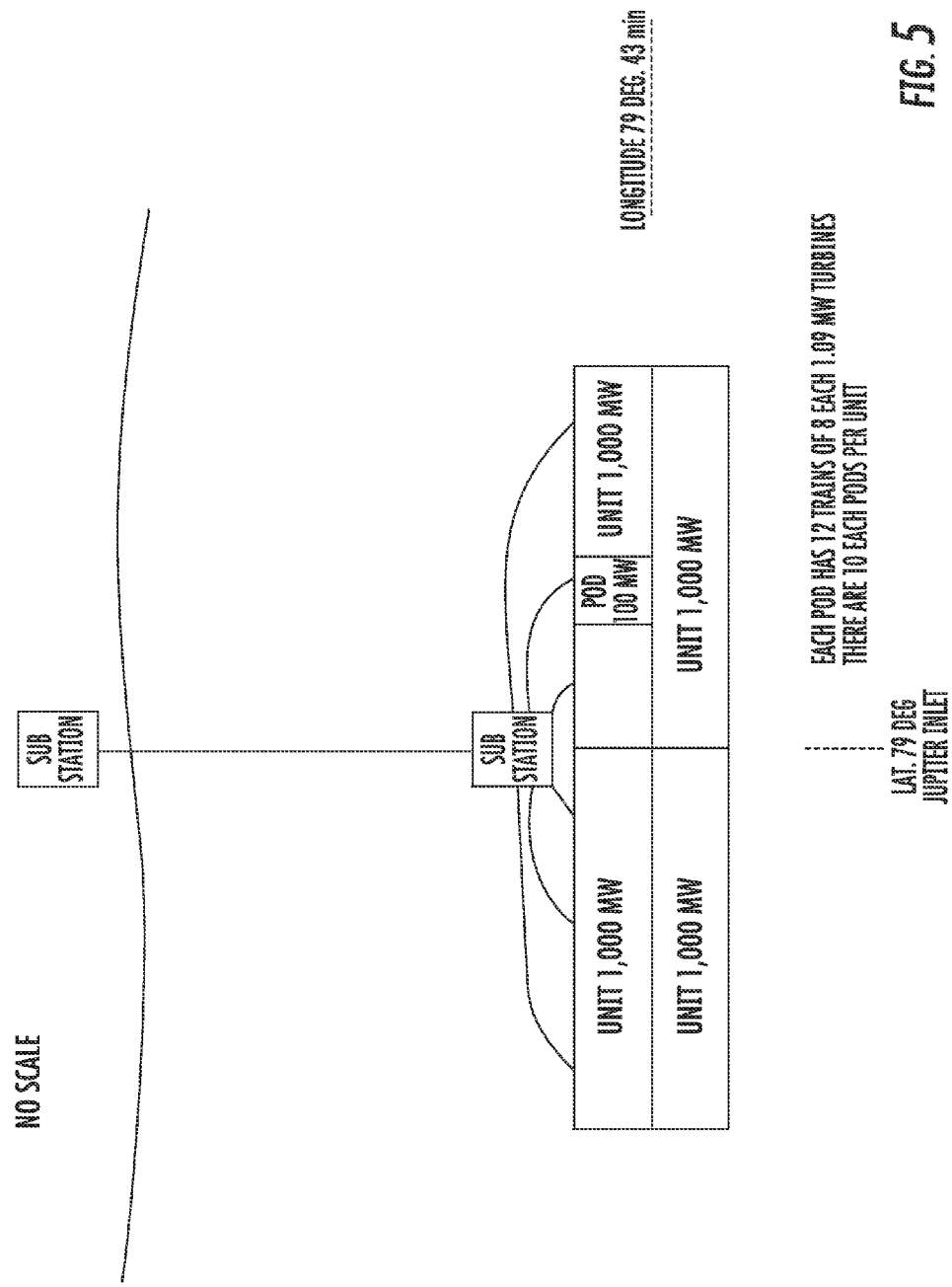
FIG. 5 is a schematic showing the power generation system.

FIG. 4 illustrates, by way of example, one arrangement for the turbine shroud assembly 500. As previously discussed, the turbine shroud assembly 500 includes two parts: a plate shroud 510 and a hydro-turbine 520. First turning to the plate shroud 510, the device is preferably neutrally buoyant through inclusion of Styrofoam to offset its steel construction. Although the turbine shroud 500 can take many a form, the device includes a cylindrical fastener ring 530 inter-dispersed between two conical portions 540.

The first conical portion 550 includes an outer opening 551 and a interior edge 552. The outer opening 551 has a diameter greater than the interior edge 552. Moreover, the interior edge 552 connects with the fastener ring 530 which maintains a hydro-turbine 520. Through this construction, currents are directed through the first conical portion 550 into the hydro-turbine 520.

In comparison, the second conical portion 560 shape mirrors the first conical portion 550. More specifically, the second conical shape has an outer opening 561 and an interior edge 562. Again, the interior edge 552 has a diameter less than the outer opening 561. Such interior edge 552 again connects with the fastener ring 530. Such design allows current to be directed out and away from the hydro turbine 520 and materially improves overall hydro-turbine 520 efficiency.

As further shown in FIG. 4, the turbine shroud 500 includes four connectors 570 on the four corners on the turbine shroud 500. These four connectors 570 position the four main cables coming from the central control vessel 400. The high tension in these four cables caused by the large drag forces is what holds the several turbine shroud 500 assemblies in position at 100 feet below the ocean surface 301.

The turbine train 700 relies on the control vessel 400 to maintain that depth. The large drag force on each hydro-turbine 520 will control its orientation. The fifth connector is required when the hydro-turbine 520 is to be removed from the turbine shroud 500 for maintenance or replacement. That fifth connector is connected to the turbine shroud 500 buoy by cable. There is also a threading cable with a restraining ball at the bottom of the hydro-turbine 520. When the derrick comes along side the buoy it picks the turbine up and changes it out but still maintaining location of the shroud through the restraining ball.

As shown and illustrated, there are preferably three top connectors 570: a first connector 561 positioned at the outer opening 551 of the first conical portion 550, a second connector 562 positioned on the top of the fastener ring 530, and a third connector 563 placed on the outer opening 562 of the second conical portion 560. Each connector 570 is attached to a cable 580, which in turn is connected to a positioning buoy 590.

Such positioning buoy 590 preferably is painted a bright and/or reflective color to allow easy location of each hydro-turbine 520 should there be a need for repair or maintenance. Moreover a system of pulleys 595 can be used to regulate each cable 580 to lower or raise the turbine shroud 500 about the ocean surface 301. Accordingly, these pulleys 595 can let out (or alternatively draw in) a sufficient amount of cable 580 in order to maintain the turbine shroud 500 at approximately 100 feet below the ocean surface 301. In addition, such pulleys 595 can be used to tilt the turbine shroud 500 to maximize contact with the current.

One issue faced by the turbine assembly 100 is the risk of torsion/rotation of the turbine train 700 which may develop during the slow rotation of the individual hydro-turbines 520. These rotation forces are especially true when there is slow rotation of each individual hydro-turbine 520 and when the turbine train 700 is formed with multiple individual turbine shroud 500 assemblies. The invention contemplates several design features to counter the occurrence of these rotation forces. First, the cavity within the shroud 510 can be filled with ballast in the form of seawater, or compressed air supplied by a compressor located in the turbine shroud assembly buoy to redistribute the weight of the turbine shroud 500 assembly. Second, a partial ballast system can be placed within the shroud 510 including placement of ballast weights (such as lead weights). Third, the orientation of each of the individual hydro-turbines 520 can be alternated (such that one rotates clockwise while a second downstream rotates counterclockwise). As a fourth option, a keel can be placed at the bottom of each turbine shroud 500 to provide additional stability.

Combination of the positioning buoy 590, cables 580 and system of pulleys 595 also help address torsion caused rotation of the hydro-turbine 520 positioned within the fastener ring 530. More specifically, assuming the hydro-turbine 520 rotates at a rate of nine PRM, the cables 580 and positioning buoy 590 function to stabilize the turbine shroud 500. This is especially important as any sheering or twisting of an individual turbine shroud 500 can offset and risk injury to the turbine train 700 as a whole.

The outer opening 551 of the first conical portion 550 also include four additional side connectors 575. These side connectors 575 are affixed to cables 580 which affix to either the main vessel 410 or alternatively the outer opening 561 of a second conical portion 560 of another turbine shroud 500.

Thus the cables 580 allow attachment of a series of turbine shrouds 500 to form the horizontal turbine train 700.

Electric Collection System

In addition to FIGS. 1 through 4, FIG. 5 provides a general illustration of the overall electric collection 600. The electric collection system 600 functions to harness the kinetic energy of the water currents to generate and ultimately transfer electricity for use on-shore. First turning to FIG. 4, electricity 701 is generated by the hydro-turbine 520 positioned within each turbine shroud 500. A first feed line 710 emanates from the hydro-turbine 520 along the main cables from the central control vessel 400 to the turbine shroud 500 assemblies and goes to a transformer 740 in the aft compartment of the central control vessel 400. While such cables may run along the various buoys, it is preferably that they run along the turbine shroud 500 assembles, to position the various cables below the ocean surface 201 to reduce the risk of tangling with ocean going vessels, ships and other watercraft (or risk of breakage caused by weather conditions such as hurricanes). From the control vessel transformer 740 the electricity 701 goes down to a wave hub connector and then to a subsea transformer station. At high voltage at that point the power goes from subsea to the shore and a landside switching station and into a grid.

Apart from the transport of electrical power from the sub station on the ocean floor (FIG. 5) to the substation on shore by a subsea cable, there are two other methods of storage and movement of the power. Both methods include a power line from the subsea substation to a ship tethered with vacuum caissons directly above the subsea substation. In one method that ship would be a hydrogen production ship which would transform the power into hydrogen. Other hydrogen transport ships would periodically come alongside and load hydrogen and transport it to a hydrogen unloading facility on shore. The second method would be to store the power as power in a battery or capacitor type storage facility either on the ocean floor or in a tethered ship and have another battery ship periodically move the power to shore.

That which I claim:

1. A marine turbine assembly, comprising:
   a central control vessel which includes a main vessel which is tethered to a control buoy, the main vessel having a first cap, a corresponding second cap and a tubular shell positioned between both the first cap and the second cap, wherein the control buoy includes a compressor and an air conduit which forces air into the main vessel through a manifold;
   a suction caisson used to affix the central control vessel to an ocean floor, wherein the suction caisson includes a first end, corresponding second end and a tubular shaft therebetween;
   a mooring line affixing the suction caisson to the main vessel; and
   a turbine shroud assembly having a shroud and a hydro-turbine capable of generating electricity, the turbine shroud connected via a first set of cables to a positioning buoy as well as a second set of cables affixing the turbine shroud to the main vessel.

2. The assembly of claim 1, wherein a plurality of turbine shrouds is positioned in series through cables to form a horizontal turbine train.

3. The assembly of claim 1, wherein the main vessel further includes a plurality of vertical partitions positioned within the tubular shell to assist in ballasting.

4. The assembly of claim 3, wherein one or more of the vertical partitions are perforated to allow flow of water within the tubular shell of the main vessel.

5. The assembly of claim 1, wherein the main vessel further includes both a hydrofoil and stability fins to assist in stabilizing the main vessel while in a strong water current.

6. The assembly of claim 1, wherein the mooring line attaches to the lower end of the suction caisson.

7. The assembly of claim 6, wherein the mooring line is of two part construction where a first portion is a linked chain while the second portion is made of high strength polymer.

8. The assembly of claim 1, wherein the turbine shroud includes a first conical portion, a cylindrical fastener ring and a second conical portion.

9. The assembly of claim 2, wherein one or more cables tether the turbine shroud assembly to the positioning buoy.

10. The assembly of claim 1, further comprising an electric collection system having a main feed line which transfers electricity generated by the hydro-turbine to a transformer positioned within the central control vessel, which in turn feeds the electricity to one or more substations for transmittal ashore to a power grid.

11. A marine turbine assembly, comprising:
   a central control vessel having a main vessel tethered to a control buoy;
   a foundation to secure the central control vessel to an ocean floor;
   a mooring line affixing the foundation to the main vessel;
   a hydro-turbine capable of generating electricity, the hydro-turbine connected via a first set of cables to a positioning buoy as well as a second set of cables to affix the hydro-turbine to the main vessel; and
   an electric collection system operable with the hydro-turbine.

12. The assembly of claim 11, wherein the main vessel is essentially tear shaped having a first cap, a corresponding second cap and a tubular shell positioned between both the first cap and second cap, the tubular shell having one or more vertical partitions to assist in ballasting, and wherein the control buoy includes a compressor and an air conduit which forces air into the main vessel through a manifold.

13. The assembly of claim 11, wherein a plurality of hydro-turbines is positioned in series through use of cables to form a horizontal turbine train.

14. The assembly of claim 11, wherein the electric collection system includes a main feed line which transfers electricity generated by the hydro-turbine to a transformer positioned within the central control vessel, which in turn feeds the electricity to one or more substations.

* * * * *